United States Patent [19]

Cherukuri et al.

[11] Patent Number: 4,954,353

[45] Date of Patent: Sep. 4, 1990

[54] ANHYDROUS CHEWING GUM WITH IMPROVED STABILITY

[75] Inventors: Subraman R. Cherukuri, Towaco, N.J.; Gul Mansukhani, Staten Island, N.Y.; Tommy L. Chau, Bridgewater, N.J.

[73] Assignee: Warner-Lambert Company, Morris Plains, N.J.

[21] Appl. No.: 291,707

[22] Filed: Dec. 29, 1988

[51] Int. Cl.$^5$ .............................................. A23G 3/30
[52] U.S. Cl. ........................................ 426/5; 426/99; 426/3
[58] Field of Search ...................... 426/3–6, 426/99

[56] References Cited

U.S. PATENT DOCUMENTS

| | | | |
|---|---|---|---|
| 2,289,407 | 7/1942 | Boys | 426/3 |
| 4,378,374 | 3/1983 | Reggio et al. | 426/3 |
| 4,379,169 | 4/1983 | Reggio et al. | 426/3 |
| 4,514,422 | 4/1985 | Yang et al. | 426/3 |
| 4,514,423 | 4/1985 | Tezuka et al. | 426/3 |
| 4,579,738 | 4/1986 | Cherukuri et al. | 426/3 |
| 4,581,234 | 4/1986 | Cheruhuri et al. | 426/3 |
| 4,587,125 | 5/1986 | Cheruhuri et al. | 426/3 |
| 4,721,620 | 1/1988 | Cherukuri et al. | 426/3 |
| 4,740,376 | 4/1988 | Yang | 426/5 |

*Primary Examiner*—Jeanette Hunter
*Attorney, Agent, or Firm*—Charles A. Gaglia, Jr.; Daniel A. Scola, Jr.

[57] ABSTRACT

Chewing gum compositions resistant to moisture pickup and hardening and having a moisture content less than about 1.0% and preferably less than about 0.3% by weight of the final composition, including a hard or a soft gum base, flavoring agent, sweetening agent, and a hydrophobic softening agent. The present composition may be formed without cooling and does not require conditioning prior to wrapping. Prior to wrapping the gum pieces may be coated with a sweetening agent in the known manner at ambient temperatures and up to 80% relative humidity.

23 Claims, 3 Drawing Sheets

4,954,353

ANHYDROUS CHEWING GUM WITH IMPROVED STABILITY

BACKGROUND OF THE INVENTION

The present invention relates to sugarless and sugar containing gums, including chewing gums and bubble gums, and more particularly to gum compositions substantially free from water and having desirable resistance to moisture pick up.

Conventional chewing gum process steps disclosed in the prior art involve cooling, extruding and forming into gum pieces, the formulated chewing gum composition. The formed gum must then be conditioned (setting) for 24-48 hours. Additionally, if the chewing gum is to be a hard sugar-coated gum piece (e.g., a pellet or ball), usually 48 hours of conditioning at 66°-70°F./RH 47-55% is required prior to the application of the coating. It is traditionally necessary to apply the coating under controlled temperature conditions (80°-85° F.) at low relative humidity (RH 24-40%). These conditions must be maintained closely or serious processing problems can result. For example, changes in the temperature and humidity outside of these ranges cause softening of the gum and deformation of shape which makes coating difficult. The problem has been well-known for many years and is especially harmful in areas with extreme climates such as the tropics. If the chewing gum is formed as a slab or stick gum, one prior art method required immediately wrapping the gum subsequent to 24-48 hour conditioning in order that the gum product would retain its freshness.

Additionally, conventional gum processes, which used traditional high speed wrapping machines (e g., 800-1800 sticks or slabs per minute), require the wrapping to be done at controlled temperature and humidity conditions. If the temperature or humidity became too high, the chewing gum composition would stick to the rollers and cutters. The individual gum pieces would be wrapped in airtight packages and usually those would be placed in larger boxes which themselves would be sealed to keep out air and moisture. In spite of all these precautions during processing, conventional chewing gum tends to stick to wrappers at high temperatures and to become brittle at low temperatures during storage. Additionally, conventional mint flavored chewing gum and some fruit flavors undergo oxidation of the flavors due to the interaction of the flavor with the base in the presence of moisture.

Conventional chewing gum formulations generally have a molten chewing gum base, resins, waxes, fillers, emulsifiers, an aqueous sugar syrup (corn syrup or sorbitol syrup), dry sugar (sucrose or dextrose) and flavor. The aqueous sugar syrup or non-sugar syrup has always been believed to be a necessary component as far as conventional commercial manufacture is concerned. As a result, the chewing gum product would ordinarily contain 2% to 8% by weight of moisture. As time passes, conventional products harden and become brittle as the sugar syrup crystallizes and excludes water. Ingredients such as humectants are employed to retard crystallization by retaining water. Not only is this protection temporary at best, compositions containing humectants tend to pick up moisture, resulting in processing difficulties and moisture-related product degradation.

Moisture related product degradation is one of the prime stability concerns for chewing gum compositions and products. The environmental factor influencing moisture loss or gain is relative humidity. It is commonly accepted that the lower the relative humidity, the faster things dry out. Relative humidity (RH) is a measure of the vapor pressure exerted by the moisture in the atmosphere. As relative humidity increases or decreases, the pressure of the moisture in the atmosphere increases or decreases accordingly. Pure water exerts a moisture vapor pressure equal to 100% RH. As such, that water will evaporate when stored in any environment less than 100% RH. If impurities are added to that water, the moisture vapor pressure will decrease.

Equilibrium relative humidity (ERH) is a means of identifying the susceptibility or propensity of the composition to moisture gain or loss, which in turn relates to the tendency for the gum to remain moisture stable and to not dry out or become stale, or pick up moisture and degrade. When the product neither picks up or loses moisture, it is in a state of equilibrium with the environment. The ERH measurement depends on the ratio of free moisture to bound moisture in a product and the temperature. The amount and rate at which a chewing gum loses or gains moisture depends on the differential between the product's ERH and ambient RH. The transfer of moisture will be in the direction from high to low RH until an equilibrium state is reached.

The prior art has addressed the problem of crystallization with low-moisture products that do not exclude water and harden when exposed to conditions of RH lower than ERH. U.S. Pat. No. 4,514,422 discloses a composition with less than 2% moisture derived from the use of 10% to 18% by weight of glycerin, a humectant, as a softener. However, the composition has an ERH less than 25% and is susceptible to moisture gain, and the problems related therewith, when the RH exceeds this.

Chewing gum compositions are known using propylene glycol in combination with glycerin at levels between 10% to 18% by weight. While this results in a composition with a higher ERH, the product is still susceptible to moisture gain and moisture gain related problems.

U.S. Pat. No. 4,581,234 discloses a composition with less than 0.3% moisture and resistant to moisture gain up to 80% RH. However, critical to the function of this product is the use of a soft gum base, defined as having a softening point between about 40° C. and about 60° C. Chewing gum compositions resistant to hardening and moisture gain having formulations in which the choice of gum base softening point is not critical would be highly desirable.

U.S. Pat. No. 4,753,806 discloses a composition with 2 to 8% moisture and relatively high ERH formulated with aqueous hydrogenated starch hydrolysate cooked to a moisture content of 4 to 12% and 0 to 12% glycerin.

The present invention concerns chewing gum compositions which, unlike those of the prior art, can be processed using fewer steps, thereby saving time and production costs. The process of the present invention does not require such traditional process steps as cooling and conditioning (setting), nor does it require specified relative humidity conditions for coated gums, as does the prior art. Additionally, no protective wrapping is necessary to maintain freshness. The compositions of the present invention do not require one or more moisture containing additives, nor a soft gum base, in order to obtain a formulation of viscosity which is manageable and homogeneous, and which ultimately yields a chewing gum product which has good texture, mouthfeel and/or organoleptic properties. The present compositions, when prepared in the specified manner, have the juiciness, flavor, texture, mouthfeel and other organoleptic characteristics of known compositions which use moisture or moisture containing ingredients to achieve these characteristics.

Another advantage of the instant invention is that those ingredients which are ordinarily unstable in the presence of moisture, e.g., aspartame, do not present a problem since the inventive compositions are substantially anhydrous. Thus, traditionally moisture unstable ingredients can be added and without fear of deterioration or instability.

Another advantage to the instant invention is that the gum product formed from the disclosed compositions and using the disclosed method can be wrapped immediately after forming without the need for conventional cooling followed by conditioning for 24–48 hours. The inventive compositions can be wrapped immediately within 2 hours of rolling without fear of wrapping materials adhering to the chewing gum product.

Another advantage of the instant invention is that chewing gum products formed by means of the disclosed process and containing the disclosed compositions can remain without wrapping or protective covering at ambient temperatures for longer periods of time than traditional chewing gums without going stale, becoming tacky or showing instability. Thus, the inventive compositions retain their freshness for up to a year or more without the need for protective, hermetic wrappings.

As stated above, the inventive process does not require all of the process steps of the prior art. The chewing gum compositions once formed do not have to be cooled prior to formation into gum pieces, nor conditioned prior to wrapping. These advantages are due to the specific and novel formulations presented herein.

Other advantages of the present compositions and process of preparation will become apparent from the detailed description provided herein.

SUMMARY OF THE INVENTION

The present invention is directed to chewing gum compositions with less than about 1.0% moisture, preferably less than about 0.3% moisture, resistant to moisture gain, and having good texture, mouthfeel and organoleptic properties and which can be prepared from both low and high softening point gum bases by being formulated with one or more hydrophobic softening agents. The softening agents include mineral oils, partially hydrogenated vegetable oils, polyglycerol esters having hydrophilic-lipophilic balances less than about 14, and mixtures thereof. The composition includes a gum base, a flavoring agent, and a sweetening agent together with the above-described softening agent. Emulsifiers, bulking agents, fillers, mineral adjuvants and coloring agents may optionally be included.

Regardless of whether the composition is formulated from a low or high softening point gum base, the resulting composition demonstrates superior resistance to moisture gain heretofore unknown in the art. The compositions may be prepared by admixing melted gum base, flavoring agent, sweetening agent and the hydrophobic softening agent, until a uniform homogeneous mass is formed. The mass is extruded and formed into suitable chewing gum pieces without cooling, and then wrapped. Before wrapping, the pieces may be coated with a sweetening agent at ambient temperatures at up to 80% RH.

DETAILED DESCRIPTION OF THE PREFERRED EMBODIMENT

Figure 1:
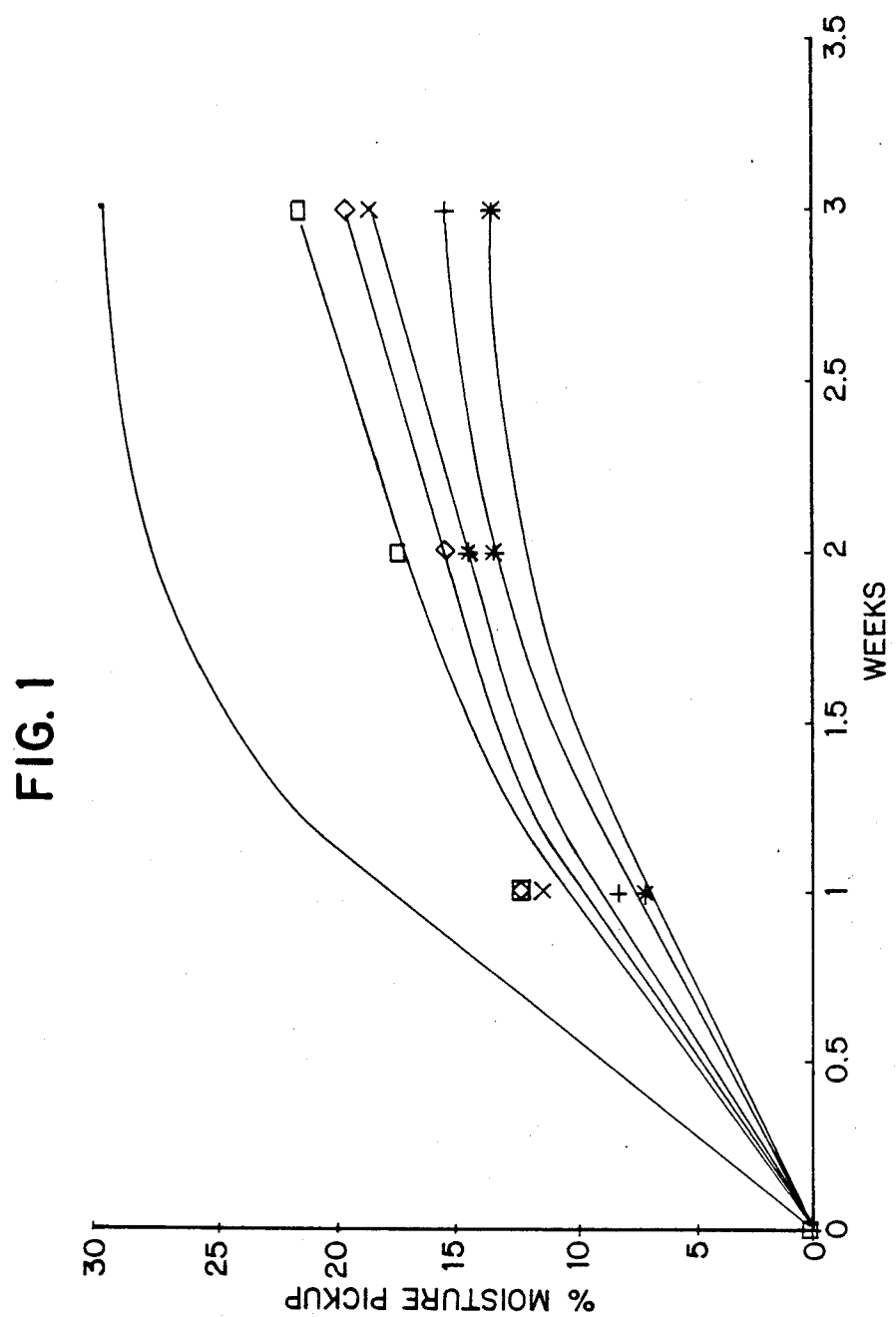
FIG. 1 is a graph showing weight percent moisture gain against time for chewing gum samples subject to accelerated aging by exposure to 80% RH at 27° C.

The moisture stable anhydrous chewing gum of the present invention can be prepared in sugar or sugarless gum combinations which can be made into a variety of products, e.g., sticks, slabs, chunks, balls, ropes, tablets, and/or center-filled products. The chewing gum compositions of the instant invention have a moisture content of less than about 1.0% and preferably less than about 0.3% by weight of the final composition. Moisture containing ingredients, such as aqueous solutions and moisture retaining ingredients, such as humectants, are not used and the compositions therefore do not suffer from hardening due to loss of moisture to the atmosphere nor from moisture degradation due to pickup of moisture from the atmosphere.

The compositions of the invention use a hydrophobic softening agent to provide unique chewing gum compositions having significant resistance to moisture gain, indicative of high ERH values. While the invention is not to be limited to theoretical considerations, it is believed that the superior moisture-resistant properties result from the coating of the more hygroscopic ingredients of the composition by the hydrophobic softening agent, thereby preventing their absorption of moisture from the air.

Chewing gum formulations employing the novel method of the present invention will vary greatly depending upon various factors such as the type of base used, consistency desired and other components used to make the final product. In general, amounts of about 5% to about 55% by weight of the final chewing gum composition are acceptable for use, with preferred amounts of about 15 to about 40% and more preferably about 20% to about 35% by weight.

Unlike U.S. Pat. No. 4,581,234 the softening point of the gum base is not critical. The gum base may be a traditional hard base having a softening point between about 70° C. and about 120° C., or the gum base may be a soft gum base, which softens at a temperature range between about 40° C. and about 60° C. Soft gum bases formulated according to the present invention demonstrate resistance to moisture gain superior to that of the chewing gum compositions disclosed in U.S. Pat. No. 4,581,234.

The gum base may be any water insoluble gum base well known in the art. Illustrative examples of suitable polymers in gum bases include natural and synthetic elastomers and rubbers, and mixtures thereof. For example, those polymers which are suitable in gum bases, include, without limitation, substances of vegetable origin such as chicle, jelutong, balata, crown gum, guttapercha, lechicapsi, sorba and the like and mixtures thereof. Synthetic elastomers such as butadiene-styrene copolymers, isobutylene-isoprene copolymers, polyethylene, polyisobutylene, polyvinylacetate and mixtures thereof, are particularly useful. The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of alpha-pinene or beta-pinene, terpene resins including polyterpene and mixtures thereof. The solvents may be employed in amounts ranging from about 10% to about 75% and preferably from about 45% to about 70% by weight to the gum base.

According to the present invention, the softening agent may be any of the known hydrophobic softening agents. This includes natural or petroleum oils or waxes. Preferred hydrophobic softening agents include partially hydrogenated vegetable oils and mineral oils. A particularly useful class of softening agents are the polyglycerol esters having a hydrophilic-lipophilic balance less than about 14. Hydrophilic-lipophilic balance determination is a measurement technique known and used by those skilled in the art to quantify a compound as either hydrophobic or hydrophilic. Compounds having hydrophilic-lipophilic balances less than about 14 are generally considered hydrophobic, while compounds having hydrophilic-lipophilic balances greater than about 14 are generally considered hydrophilic. Mixtures of the above softening agents are also acceptable.

Polyglycerol esters having hydrophilic-lipophilic balances less than about 10 are even more preferred, and balances of less than about 8 are most preferred. Other suitable hydrophobic softening agents include fats and oils from animal sources. Of the vegetable oils, cottonseed oil, soybean oil, hard palm oil, corn oil, and mixtures thereof are preferred.

Suitable polyglycerol esters include fatty acid esters such as stearate and oleate esters, including, but not limited to, triglycerol monostearate, hexaglycerol distearate, decaglycerol hexaoleate, decaglycerol decaoleate and mixtures thereof.

The resistance to moisture pickup of the chewing gum compositions of the present invention is a direct function of the quantity of the disclosed softening agents used, with any minimal quantity of softening agent contributing an improvement over compositions lacking same. The quantity of softening agent must not exceed that amount capable of plasticizing the elastomers and resins in the gum base, thereby resulting in too soft of a product lacking acceptable chew characteristics and tending to disintegrate in the mouth. In general, the amount of softening agent may vary with the desired texture selected for a particular chewing gum base. This will be a function of gum base hardness, with harder gum bases requiring more softening agent than softer gum bases. The quantity of softening agent should be adequate to provide sufficient discontinuity to the gum base, and can be readily determined by one of average skill in the art. This amount will normally be between about 0.10% and about 10%, with amounts between about 1.0% and about 7.0% preferred, and amounts between about 2.0% and about 3.0% more preferred.

The present invention also contemplates the encapsulation of some or all of the flavoring agent, the sweetening agent, and mixtures thereof to prolong the duration of flavor and sweetness sensation.

Encapsulated delivery systems for flavoring agents or sweetening agents comprise a hydrophobic matrix of fat or wax surrounding a sweetener or flavoring component core. The fats may be selected from any number of conventional materials such as fatty acids, glycerides, polyglycerol esters, sorbitol esters, and mixtures thereof. Examples of fatty acids include hydrogenated and partially hydrogenated vegetable oils such as palm oil, palm kernel oil, peanut oil, rapeseed oil, rice bran oil, soybean oil, cottonseed oil, sunflower oil, safflower oil and mixtures thereof. Other fatty acid oils are contemplated. Glycerides which are useful include mono-, di- and triglycerides.

Waxes useful are chosen from among the group consisting of natural or synthetic waxes and mixtures thereof. Non-limiting examples include paraffin wax, petrolatum, carbowax, microcrystalline wax, beeswax, carnuba wax, candellila wax, lanolin, bayberry wax, sugarcane, spermaceti wax, rice bran wax and combinations thereof.

The fats and waxes may be used individually or in combination in amounts varying from about 10 to about 70% by weight of the delivery system, and preferably in amounts of about 40 to about 58% by weight. When used in a combination, the fat and wax are preferably present in a ratio of about 70:10 to about 85:15 of fat to wax.

Typical encapsulated flavor or sweetness delivery systems are disclosed in U.S. Pat. Nos. 4,597,970 and 4,722,845.

Flavoring agents well known to the chewing gum art may be added to the chewing gum compositions of the instant invention. These flavoring agents may be chosen from synthetic flavor oils, flavorings and/or oils derived from plants, leaves, flowers, fruits and so forth, and combinations thereof. Representative flavor oils include: spearmint oil, cinnamon oil, oil of wintergreen (methylsalicylate) and peppermint oils as well as their flavoring replacements. Also useful are artificial, natural or synthetic fruit flavors such as citrus oil including lemon, orange, grape, lime and grapefruit and fruit essences including apple, strawberry, cherry, pineapple, banana and so forth. Other fruit flavors well known to the art are also employable. Mixtures can be employed.

The amount of flavoring agent employed is normally a matter of preference subject to such factors as flavor type, base type and strength desired. In general, amounts of about 0.05% to about 3.0% by weight of the final chewing gum composition are usable with amounts of about 0.3% to about 1.5% being preferred and about 0.7% to about 1.2% being most preferred.

The chewing gum compositions generally contain a major portion of a sweetening agent. Sweetening agents can be selected from a wide range of materials such as water-soluble sweetening agents, water-soluble artificial sweetening agents, and dipeptide-based sweeteners, including mixtures thereof. Without being limited to particular sweeteners, representative illustrations encompass:

A. Water-soluble sweetening agents such as monosaccharides, disaccharides, and polysaccharides such as xylose, ribose, glucose, mannose, galactose, fructose, dextrose, sucrose, sugar, maltose, partially hydrolyzed starch or corn syrup solids and sugar alcohols such as sorbitol, xylitol, mannitol and mixtures thereof.

B. Water-soluble artificial sweetening agents such as the soluble saccharin salts, i.e., sodium or calcium saccharin salts, cyclamate salts, acesulfame-K and the like, and the free acid form of saccharin.

C. Dipeptide based artificial sweetening agents such as L-aspartyl-L-phenylalanine methyl ester and materials described in U.S. Pat. No. 3,492,131 and the like.

D. Chlorosucrose derivatives.

The water-soluble sweetening agents described in category A above, are preferably used in amounts of about 25% to about 75% by weight and most preferably from about 50% to about 65% by weight of the final chewing gum composition. In contrast, the artificial sweetening agents described in categories B and C are used in amounts of about 0.005% to about 5.0% and most preferably about 0.05% to about 2.5% by weight of the final chewing gum composition. These amounts are ordinarily necessary to achieve the desirable sweetness independent of the flavor level achieved from flavor oils.

The chewing gum compositions of this invention may additionally include the conventional additives of coloring agents such as titanium dioxides; additional fillers such as aluminum hydroxide, alumina, aluminum silicates; gum base fillers such as talc and calcium carbonate and combinations thereof; and additional emulsifiers such as lecithin and glycerol monostearate. The amount of filler in the gum base should remain within the range of about 10 to about 25% by weight of the gum base.

The process embodying method of the present invention is as follows. The gum base is conventionally at temperatures that may range from about 40° C. to about 120° for a period of time sufficient to render the base molten. For example, the gum base may be heated under these conditions for a period of about 30 minutes just prior to mixing with the remaining ingredients of the gum composition.

A preferred procedure involves mixing the heated gum base with the water-soluble sweetening agent, and flavoring. The optional water-soluble artificial sweetener, dipeptide-based sweetener and colorant are also added at this time if present. The nature of the claimed invention requires, in order to be mixed properly, that, as the mixing begins, the hydrophobic softening agent is added to the heated mixture to wet out the above ingredients, especially the sweetening agent. Otherwise the ingredients would not bind to and blend with the gum base. It is also at this stage that the hydrophobic softening agent coats the hygroscopic ingredients to provide moisture resistance to the final composition. The remainder of the ingredients, and other additives, if any, are added and the resulting composition is then mixed for a period of time that may range as high as 30 minutes, to form a fully uniform homogeneous composition. The mass is then removed from the mixer and may thereafter be formed into various final shapes by known gum manufacturing techniques, without cooling. For example, the mass may be rolled in contact with a conventional dusting medium, such as calcium carbonate, mannitol, talc and others.

Unlike conventional chewing gum compositions, the present compositions do not require conditioning prior to wrapping and can be wrapped immediately within two hours of rolling without fear of wrapping materials adhering to the chewing gum product. Prior to wrapping, the chewing gum pieces may be coated with a sweetening agent in the known manner at ambient temperatures and up to 80% relative humidity.

The techniques associated with the preparation of the products are well-known and the present method may vary somewhat depending upon the specific end product to be manufactured, without departing from the essential parameters relating to the addition of hydrophobic softening agents. Such other details are presented for purposes of illustration and to provide a best mode for the practice of the invention, and therefore the invention should not be limited to those parameters.

Chewing gum products made by the above process using the disclosed formulations have remained fresh, soft and pliable for one year or more with a minimum of protective packaging. For example, unwrapped sticks of chewing gum have remained soft, pliable and have retained their quality and freshness for a year or more in the open air or in unsealed pouches. This advantage is attributable to the combination of chewing gum ingredients processed in the manner described.

The instant invention therefore contemplates a chewing gum composition which remains fresh for a year or more with a minimum of protective wrapping, having a moisture content of up to about 0.3% by weight and capable of being extruded, formed, coated and wrapped without cooling or conditioning.

The following examples are given to illustrate the invention, but are not deemed to be limiting thereof. All percentages given throughout the specification are based upon weight unless otherwise indicated.

EXAMPLES

EXAMPLES 1-6

Experimental samples of substantially moisture free chewing gum resistant to moisture pickup are prepared together with a glycerin-softened control sample, according to the following formulations listed in Table 1.

Examples 2-6 showed significantly higher ERH values than Example 1, a control representing a conventional formulation, and, as would be expected, demonstrated superior resistance to moisture pick-up over the control.

TABLE 1

| Ingredients | Percentage (w/w) | | | | | |
|---|---|---|---|---|---|---|
| Example | 1 | 2 | 3 | 4 | 5 | 6 |
| Gum Base | 30.0% | 30.0% | 30.0% | 30.0% | 30.0% | 30.0% |
| Liquid and Spray-Dried Flavoring | 1.696 | 1.696 | 1.696 | 1.696 | 1.696 | 1.696 |
| Sorbitol | 43.479 | 56.479 | 56.479 | 56.479 | 56.479 | 56.479 |
| Mannitol | 7.00 | 7.00 | 7.00 | 7.00 | 7.00 | 7.00 |
| Free and Encapsulated Saccharin | 2.153 | 2.153 | 2.153 | 2.153 | 2.153 | 2.153 |
| Coloring Agent | 0.172 | 0.172 | 0.172 | 0.172 | 0.172 | 0.172 |
| Softening Agent | | | | | | |

TABLE 1-continued

| Ingredients | Percentage (w/w) | | | | | |
|---|---|---|---|---|---|---|
| Example | 1 | 2 | 3 | 4 | 5 | 6 |
| Lecithin | 0.50 | 0.50 | 0.50 | 0.50 | 0.50 | 0.50 |
| Glycerin | 15.00 | — | — | — | — | — |
| Oil/Glycerol Ester[1] | — | 2.00 | — | — | — | — |
| Vegetable Oil[2] | — | — | 2.00 | — | — | — |
| Mineral Oil | — | — | — | 2.00 | — | — |
| Triglycerol Monostearate | — | — | — | — | 2.00 | — |
| Decaglyceryl Decaoleate | — | — | — | — | — | 2.00 |
| ERH (%) | 26 | 38 | 36 | 40 | 42 | 37 |

[1] Partially hydrogenated vegetable oil and polyglycerol esters of fatty acid
[2] Partially hydrogenated cottonseed and soybean oils.

QUANTITATIVE DETERMINATION OF MOISTURE PICKUP

Unwrapped chewing gum sticks formed from Examples 1–6 were prepared, weighed and put into a dessicator containing a saturated solution of ammonium chloride to induce 80% RH. The dessicator is then placed at a 27° C. incubator. The gum pieces are then reweighed weekly for three consecutive weeks. The weight change is attributed to moisture pickup and the percent dewing is calculated therefore as follows:

$$\frac{\text{New weight} - \text{original weight}}{\text{original weight}} \times 100 = \% \text{ dewing}$$

The results of these tests, depicted graphically in FIG. 1, indicate that the present formulations prepared by the present process show insignificant change in percent dewing after three weeks at 27° C./80% RH. The control, representing a conventional formulation, however, showed a marked increase in moisture pickup within the first week.

EXAMPLES 7–10

Figure 2:
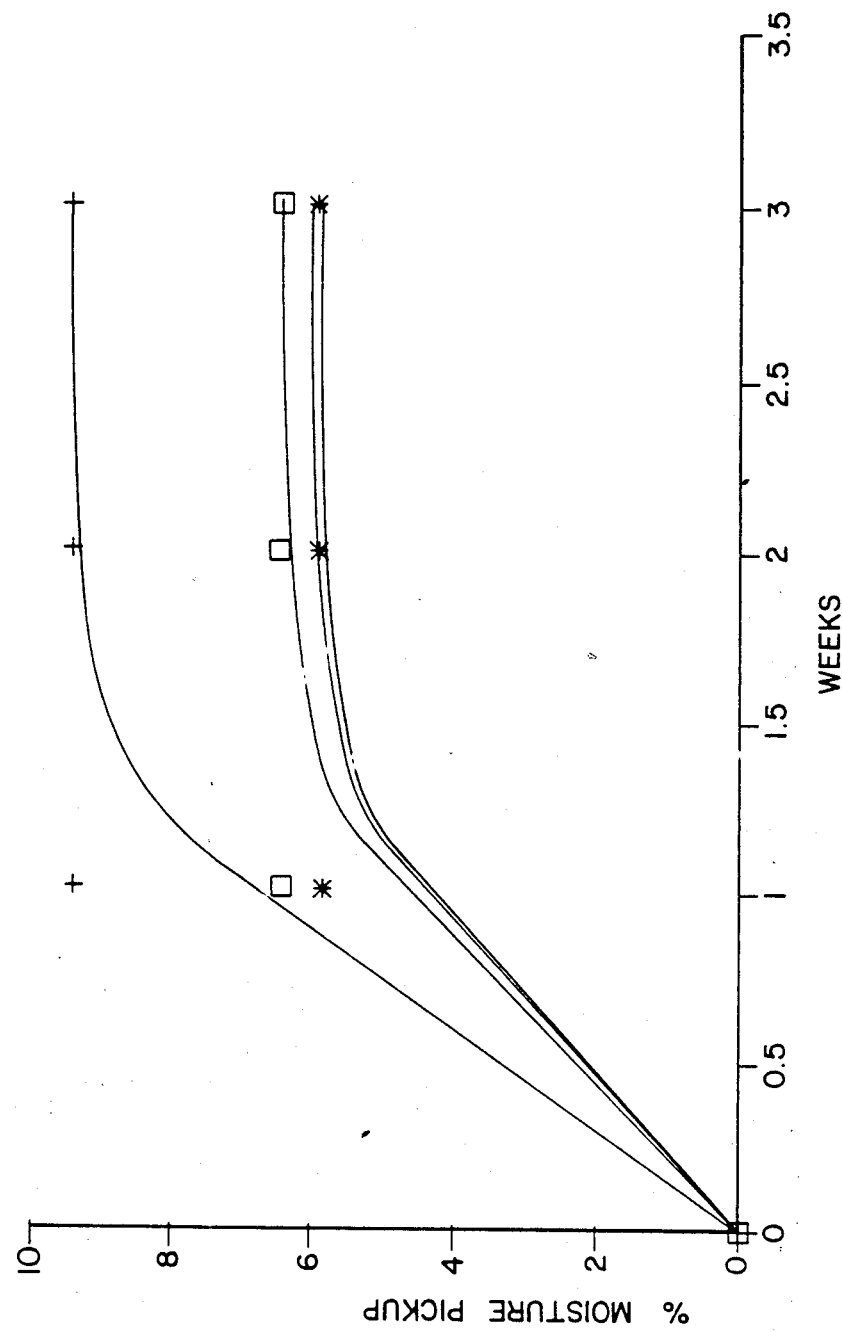
FIG. 2 is a graph showing weight percent moisture gain against time for chewing gum samples subject to accelerated aging by exposure to 80% RH at 27° C.

Experimental samples were prepared as in Examples 2–6, according to the formulation listed in Table 2. Examples 7–10 also showed significantly higher ERH values than the Example 1 control as well as superior resistance to moisture pick-up measured in percent dewing, depicted in FIG. 2. Examples 7–10 out-performed the control and examples 2–6 after three weeks exposure to 27° C./80% RH.

TABLE 2

| Ingredients | Percentage (w/w) | | | |
|---|---|---|---|---|
| Example | 7 | 8 | 9 | 10 |
| Gum Base | 26.000 | 26.000 | 26.000 | 26.000 |
| Sorbitol | 61.494 | 61.494 | 61.494 | 61.494 |
| Mannitol | 7.000 | 7.000 | 7.000 | 7.000 |
| Liquid and Spray-Dried Flavoring | 1.696 | 1.696 | 1.696 | 1.696 |
| Free Saccharin | 0.138 | 0.138 | 0.138 | 0.138 |
| Color | 0.172 | 0.172 | 0.172 | 0.172 |
| Softener | | | | |
| Lecithin | 0.500 | 0.500 | 0.500 | 0.500 |
| Partially Hydrogenated Vegetable Oils and Polyglycerol Esters of Fatty Acids | 3.000 | — | — | — |
| Triglycerol Monostearate | — | 3.000 | — | — |
| Mineral Oil | — | — | 3.000 | — |
| Decaglyceryl Decaoleate | — | — | — | 3.000 |
| ERH (%) | 49 | 40 | 42 | 37 |

EXAMPLES 11 AND 12

An experimental sample was prepared as in Examples 1–6 using higher quantities of gum base and hydrophobic softening agent, together with a control sample using the same gum base and glycerin softening agent, according to the formulations listed in Table 3.

Figure 3:
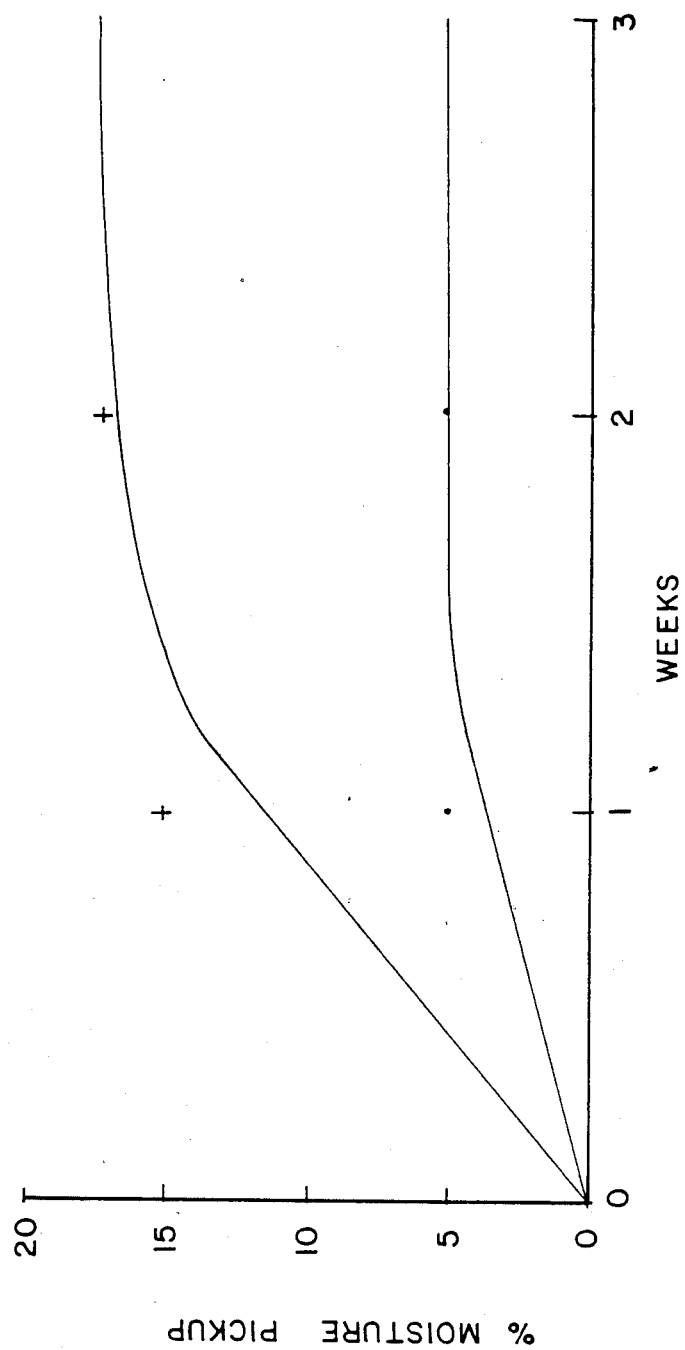
FIG. 3 is a graph showing weight percent moisture gain against time for chewing gum samples subject to accelerated aging by exposure to 80% RH at 27° C.

Example 11 showed a significantly higher ERH value than Example 12, a control using glycerin, a conventional softening agent. As would be expected, Example 11 demonstrated improved resistance to moisture pickup over Example 12, measured in percent dewing. The better performance of Example 11 over Example 12 upon exposure of these two samples to 27° C./80% RH for three weeks is depicted in FIG. 3.

TABLE 3

| Ingredients | Percentage (w/w) | |
|---|---|---|
| Example | 11 | 12 |
| Gum base | 45.000 | 45.000 |
| Sorbitol | 38.494 | 30.494 |
| Mannitol | 7.000 | 7.000 |
| Color | 0.172 | 0.172 |
| Liquid and Spray Dried Flavoring | 1.696 | 1.696 |
| Free Saccharin | 0.138 | 0.138 |
| Softenertc | | |
| Lecithin | 0.500 | 0.500 |
| Partially Hydrogenated Vegetable Oil | 7.000 | — |
| Glycerin | — | 15.000 |
| ERH (%) | 37 | 30 |

It is apparent that the present formulations are extremely stable in the presence of extreme humidity conditions, whereas conventional chewing gums have high moisture pickup and are relatively unstable in this regard.

The invention being thus described, it will be obvious that the same may be varied in many ways. Such variations are not to be regarded as a departure from the spirit and scope of the invention, and all such modifications are intended to be included within the scope of the following claims.

We claim:

1. An anhydrous chewing gum composition resistant to moisture pickup comprising:
   (a) a homogeneous mixture of a gum base, a flavoring agent, a sweetening agent and
   (b) a hydrophobic softening agent, wherein the hydrophobic softening agent is admixed with the mixture from step (a) to provide moisture resistance to the composition.

2. The chewing gum composition of claim 1, comprising from about 0.10% to about 10.0% of said softening agent by weight of said chewing gum composition.

3. The chewing gum composition of claim 2, comprising from about 1.0% to about 7.0% of said softening agent by weight of said chewing gum composition.

4. The chewing gum composition of claim 3, comprising from about 2.0% to about 3.0% of said softening agent by weight of said chewing gum composition.

5. The chewing gum composition of claim 1, wherein said softening agent is selected from the group consisting of partially hydrogenated vegetable oils, mineral oils, polyglycerol esters having a hydrophilic-lipophilic balance less than about 14, and mixtures thereof.

6. The chewing gum composition of claim 5, wherein said polyglycerol ester is a fatty acid ester.

7. The chewing gum composition of claim 6, wherein said polyglycerol fatty acid ester is selected from the group consisting of stearate esters, oleate esters, and mixtures thereof.

8. The chewing gum composition of claim 7, wherein said polyglycerol fatty acid ester is selected from the group consisting of triglycerol monostearate, hexaglycerol distearate, decaglycerol hexaoleate, decaglycerol decaoleate, and mixtures thereof.

9. The chewing gum composition of claim 5, wherein said partially hydrogenated vegetable oil is selected from the group consisting of cottonseed oil, soybean oil, hard palm oil, corn oil and mixtures thereof.

10. The chewing gum composition of claim 1, wherein said sweetening agent is selected from the group consisting of water-soluble sweetening agents, water-soluble artificial sweetening agents, dipeptide based sweetening agents, chlorosucrose derivatives and mixtures thereof.

11. The chewing gum composition of claim 1, wherein said flavoring agent is selected from the group consisting of peppermint oil, spearmint oil, cinnamon oil, oil of wintergreen, fruit flavors and mixtures thereof.

12. The chewing gum composition of claim 11, wherein said flavoring agent is encapsulated in a hydrophobic mixture of fat or wax.

13. The chewing gum composition of claim 1, further comprising at least one additive selected from the group consisting of emulsifiers, bulking agents, fillers, mineral adjuvants, coloring agents and mixtures thereof.

14. The chewing gum composition of claim 1, wherein said gum base includes an elastomer selected from the group consisting of natural elastomers and synthetic elastomers.

15. The chewing gum composition of claim 1, wherein said gum base has a softening point between about 60° C. and about 120° C.

16. The chewing gum composition of claim 1, having a moisture content up to 0.3% by weight of the final composition.

17. An anhydrous chewing gum composition resistant to moisture pickup comprising:

(A) a homogeneous mixture of
  (a) from about 5% to about 55% by weight of a gum base;
  (b) from about 0.05% to about 3.0% of a flavoring agent; and
  (c) from about 25% to about 75% by weight of a water soluble sweetening agent, and
(B) from about 0.10% to about 10% by weight of a hydrophobic softening agent, selected from the group consisting of partially hydrogenated vegetable oils, mineral oils, polyglycerol esters having a hydrophilic-lipophilic balance less than about 14, and mixtures thereof;

wherein the hydrophobic softening agent is admixed with the mixture from step (A) to provide moisture resistance to the composition.

18. The chewing gum composition of claim 17, which further includes an artificial sweetening agent selected from the group consisting of water-soluble artificial sweetening agents, dipeptide based sweetening agents and chlorosucrose derivatives.

19. A process for preparing a substantially moistureless chewing gum composition resistant to hardening and moisture pickup, which process comprises:

(a) admixing melted gum base and sweetening agent, said gum base and sweetening agent being substantially moistureless, and mixing until a homogeneous mass is formed;
(b) admixing a flavoring agent and mixing until a homogeneous mass is formed;
(c) admixing a hydrophobic softening agent to the mixture from step (b) and mixing until a homogeneous mass is formed; and
(d) forming said homogeneous mass into suitable chewing gum pieces without cooling.

20. The process of claim 19, further including coating said chewing gum pieces with a sweetening agent at ambient temperatures and at up to 80% relative humidity.

21. A chewing gum composition, prepared by the process of claim 19, in the form of a stick, slab, chunk, ball, rope, tablet or center-filled gum.

22. The process of claim 19, wherein said hydrophobic softening agent is selected from the group consisting of partially hydrogenated vegetable oils, mineral oils, polyglycerol esters having a hydrophilic-lipophilic balance less than about 14 and mixtures thereof.

23. A chewing gum composition, prepared by the process of claim 19, having a moisture content up to about 0.3%.

* * * * *